Dec. 6, 1949     L. K. HEDDING     2,490,435

ELECTRICAL RECTIFIER CONSTRUCTION

Filed Aug. 11, 1948

INVENTOR.
Linnie K. Hedding
BY
HIS ATTORNEY

Patented Dec. 6, 1949

2,490,435

UNITED STATES PATENT OFFICE 2,490,435

ELECTRICAL RECTIFIER CONSTRUCTION

Linnie K. Hedding, Wilkinsburg, Pa., assignor to The Union Switch & Signal Company, Swissvale, Pa., a corporation of Pennsylvania Application August 11, 1948, Serial No. 43,723

9 Claims. (Cl. 175—366)

My invention relates to electrical rectifier construction, and particularly to an arrangement of a number of rectifier elements of the dry surface contact type, such as the well-known copper oxide or selenium asymmetric units, in a stack or column surrounding a tube of insulating material.

Various provisions have previously been made for protecting rectifier stacks of this type from moisture and other corrosive agents. Different types of paint films have been tried, but it has been found difficult to obtain perfect covering by these, and such coatings tend to deteriorate with time. Rectifier stacks have also been immersed in oil for protection against corrosion, but this results in a bulky piece of apparatus, and has other disadvantages.

One feature of my invention is the provision of a novel and improved arrangement, embodying gaskets of rubber or other suitable resilient material, for sealing the rectifier elements to prevent access of moisture or other corrosive agents, and at the same time to provide an efficient cooling arrangement for the rectifier elements.

The apparatus of my invention is an improvement over that which is disclosed in the copending application, Serial No. 795,068, filed December 31, 1947, by Richard Geoffrey Sell and Roger Harry Cubitt for Alternating current rectifiers.

I shall describe two forms of apparatus embodying my invention, and shall then point out the novel features thereof in claims.

Figure 1:
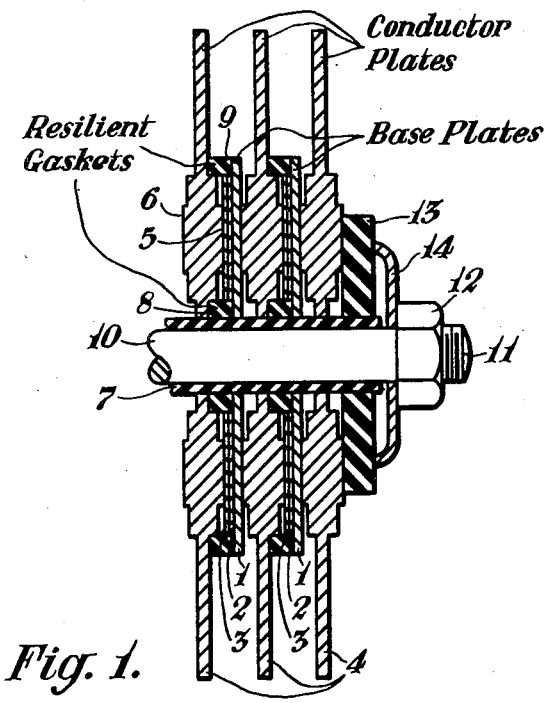
Figure 2:
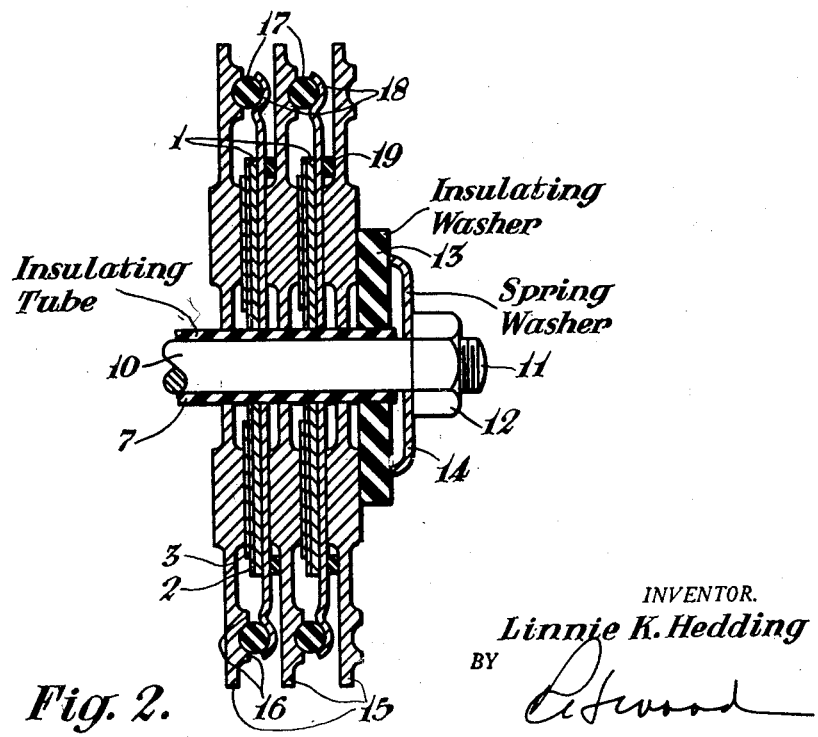

In the accompanying drawings, Fig. 1 is a side cross section view showing one form of electrical rectifier construction embodying my invention; and Fig. 2 is a side cross section view showing a modified form of the electrical rectifier construction shown in Fig. 1, and also embodying my invention.

Similar reference characters refer to similar parts in each of the views.

Referring first to Fig. 1, a portion, including one end of an electrical rectifier stack assembly is shown, embodying a plurality of apertured metal base plates 1, each of which has a coating on one side, except a first strip adjacent its aperture, and a second strip adjacent its perimeter. The coating comprises two layers, 2 and 3, in which layer 2 may be of selenium, and layer 3 may be of a suitable counterelectrode material. Such a coating applied to each base plate 1 provides asymmetric electrical conductivity through each base plate and its coating, so that each base plate and its coating serve as an asymmetric unit. The base plates are consecutively arranged to form a stack.

The rectifier assembly also includes a plurality of apertured conductor plates 4, arranged one between each two consecutive base plates. A projecting portion 5 of one side of each of the conductor plates within the stack is contiguous to the coated side of one of two such consecutive base plates, and a projecting portion 6 of the other side of each conductor plate is contiguous to the uncoated side of the other of two such consecutive base plates.

The conductor plates 4 serve as cooling fins for conducting heat away from the asymmetric units while the rectifier is in service. Electrical terminals may be affixed to such of the conductor plates as desired, so that the conductor plates may also serve as conductors of electricity to the electrical terminals as well as from one asymmetric unit to another.

The base plates 1 and conductor plates 4 are mounted on an insulating tube 7 which extends through the apertures of the plates.

A gasket 8 of a suitable resilient material, such, for example, as rubber, is fitted between the first uncoated strip of each base plate, adjacent its aperture and the adjacent conductor plate 4. A second gasket 9, also of a suitable resilient material, is fitted between the second uncoated strip of each base plate, adjacent its perimeter, and the same adjacent conductor plate 4. The purpose of each gasket 8 is to prevent indirect access to the coated portion of the associated base plate 1 of corrosive agents, such, for example, as moisture, which might pass between the uncoated sides of the base plates and the conductor plates and thence along insulating tube 7. The purpose of each gasket 9 is to prevent direct access of corrosive agents to the coated surface of the associated base plate adjacent the perimeter of the associated base plate.

A bolt 10, provided with a threaded portion 11 at each of its ends, to which a nut 12 is applied, is passed through insulating tube 7. Each nut 12 applies pressure to the adjacent end of the rectifier stack through an insulating washer 13 and a spring washer 14, for compressing the gaskets 8 and 9 for effectively sealing the coated portions of the base plates 1 and for retaining the asymmetric units in intimate contact with the contiguous conductor plates 4. Each of the insulating washers 13 may be constructed to serve as a sealing element, or other suitable sealing means may be provided for each end of the rectifier assembly.

Referring now to Fig. 2, apertured base plates 1 are coated on one side, similarly to the base plates 1 shown in Fig. 1. An apertured conductor plate 15 is here provided between each two consecutive asymmetric units. Each conductor plate 15 has a projection 16. Each projection 16 is provided with a concave portion for receiving one side of a resilient gasket 17 of rounded cross section.

A sealing plate 18 is provided between the uncoated side of each base plate 1 and the adjacent conductor plate 15. Each of the gaskets 17 is compressed between a concave portion of a sealing plate 18 and the concave portion of a conductor plate 15 on the opposite side of the adjacent base plate 1.

A second resilient gasket 19 is compressed between each sealing plate 18 and the contiguous conductor plate 15.

The purpose of each gasket 17 is to prevent direct access of corrosive agents to the coated surface of the associated base plate adjacent the perimeter of the associated base plate. The purpose of each gasket 19 is to prevent indirect access, to the coated side of the adjacent base plate 1, of corrosive agents which might pass between the contiguous sealing plate 18 and the contiguous conductor plate 15 and thence along insulating tube 7 to the coated side of the adjacent base plate 1.

Although I have herein shown and described only two forms of electrical rectifier construction embodying my invention, it is understood that various changes and modifications may be made therein within the scope of the appended claims without departing from the spirit and scope of my invention.

Having thus described my invention, what I claim is:

1. An asymmetric unit comprising, a metal base plate through which there is an opening, a coating on one side of said plate except a first strip adjacent said opening and a second strip adjacent the perimeter of said plate, for providing asymmetric electrical conductivity through said plate and said coating, a conductor plate arranged with a portion of its surface contiguous to said coating, a resilient gasket between said first strip and said conductor plate and a second resilient gasket between said second strip and said conductor plate for sealing the coated side of said metal base plate from moisture and other corrosive agents.

2. An asymmetric unit comprising, a metal base plate through which there is an opening, a coating on one side of said plate except a first strip adjacent said opening and a second strip adjacent the perimeter of said plate, for providing asymmetric electrical conductivity through said plate and said coating, a conductor plate arranged with a portion of its surface contiguous to said coating, and resilient sealing material between said first strip and said conductor plate and between said second strip and said conductor plate.

3. An asymmetric unit comprising, a metal base plate through which there is an opening, a coating on one side of said plate for providing asymmetric electrical conductivity through said plate and said coating, a conductor plate arranged with a portion of its surface contiguous to said coating, a sealing plate arranged with a portion of one of its sides contiguous to the uncoated side of said metal base plate, a resilient gasket between said sealing plate and an outer portion of said conductor plate for sealing the perimeter of the coated side of said metal base plate, a second conductor plate arranged with a portion of its surface contiguous to the opposite side of said sealing plate, and a second resilient gasket between an outer portion of said opposite side of said sealing plate and said second conductor plate.

4. An asymmetric unit comprising, a metal base plate through which there is an opening, an insulating tube extending through said opening, a coating on one side of said plate for providing asymmetric electrical conductivity through said plate and said coating, a conductor plate arranged with a portion of its surface contiguous to said coating, a resilient gasket placed for sealing between said conductor plate and the perimeter of said metal base plate, a second conductor plate on the opposite side of said metal base plate from said first conductor plate, and a second resilient gasket placed to prevent the passage of moisture and other corrosive agents to the portion of said coating which is adjacent said insulating tube from between said metal base plate and said second conductor plate.

5. In a rectifier, a plurality of base plates consecutively arranged to form a stack and through each of which there is an opening, a coating on one side of each of said base plates, except a first strip adjacent said opening and a second strip adjacent the perimeter of the base plate, for providing asymmetric electrical conductivity through each of said base plates and its said coating, a plurality of conductor plates one between each two consecutive base plates and with a portion of one of its sides contiguous to the coating on one of the two adjacent base plates and with a portion of its opposite side contiguous to the uncoated surface of the other adjacent base plate, and resilient sealing material between said first strip of each of said base plates and the adjacent conductor plate and between said second strip of each of said base plates and said adjacent conductor plate.

6. In a rectifier, a plurality of apertured base plates consecutively arranged to form a stack, a coating on one side of each of said base plates for providing asymmetric electrical conductivity through each base plate and its said coating, a plurality of conductor plates and a plurality of sealing plates one conductor plate and one sealing plate arranged between each two consecutive base plates with a portion of one side of each conductor plate contiguous to the coating on one of the two consecutive base plates and with a portion of its opposite side contiguous to one side of the adjacent sealing plate the opposite side of which is contiguous to the uncoated side of the other of the two base plates, a strip of resilient sealing material between a portion of each sealing plate near its perimeter and a portion of the conductor plate on the opposite side of the contiguous base plate, and a second strip of resilient sealing material between the opposite side of each sealing plate and the contiguous conductor plate.

7. In a rectifier, a plurality of apertured base plates consecutively arranged to form a stack, a plurality of apertured conductor plates arranged one between each two consecutive base plates, an insulating tube extending through the apertures in said base plates and said conductor plates, a coating on one side of each of said base plates for providing asymmetric electrical conductivity through each base plate and its coating, a resilient sealing gasket for each base plate placed contiguous to the conductor plate on the coated side of its base plate for preventing access of corrosive agents to the coated side of its base plate, and a second resilient sealing gasket for each base plate placed to prevent passage of corrosive agents between the uncoated side of its base plate and the adjacent conductor plate to the portion of the coated side of its base plate which is adjacent said insulating tube.

8. An asymmetric unit comprising, a base plate through which there is an opening, a coating on one side of said base plate for providing asymmetric electrical conductivity through said base plate and said coating, a conductor plate arranged with a portion of its surface contiguous to said coating, a resilient sealing gasket contiguous to said conductor plate for preventing access of corrosive agents to the coated side of said base plate at its perimeter, a second conductor plate on the opposite side of said base plate, and a second resilient sealing gasket between said base plate and said second conductor plate.

9. An asymmetric unit comprising, a base plate through which there is an opening, a coating on one side of said base plate for providing asymmetric electrical conduction through said base plate and said coating, a conductor plate arranged with a portion of its surface contiguous to said coating, a resilient sealing gasket arranged for sealing between said conductor plate and the uncoated side of said base plate, a second conductor plate on the uncoated side of said base plate, and a second resilient sealing gasket arranged for sealing between the uncoated side of said base plate and said second conductor plate.

LINNIE K. HEDDING.

No references cited.